March 22, 1966     W. F. AREY, JR., ETAL     3,242,067
FLUID HYDROGENATIVE CRACKING PROCESS WITH THE USE OF UNSULFIDED
METALLIC NICKEL ON A CRACKING CATALYST SUPPORT
Filed Oct. 31, 1961
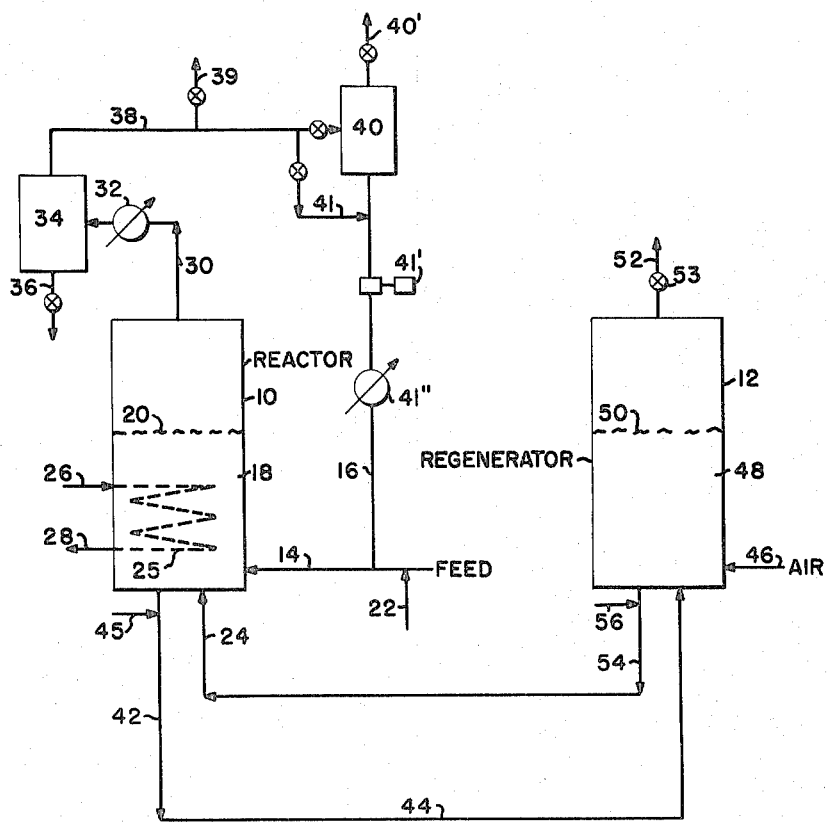
William Floyd Arey, Jr.
Howard Emerson Merrill    Inventors
By *George J. Silbay*
Patent Attorney

United States Patent Office 3,242,067
Patented Mar. 22, 1966

3,242,067
FLUID HYDROGENATIVE CRACKING PROCESS WITH THE USE OF UNSULFIDED METALLIC NICKEL ON A CRACKING CATALYST SUPPORT
William Floyd Arey, Jr., and Howard Emerson Merrill, Baton Rouge, La., assignors to Esso Research and Engineering Company, a corporation of Delaware
Filed Oct. 31, 1961, Ser. No. 149,024
3 Claims. (Cl. 208—111)

This invention relates to hydrogenative cracking carried out in a fluidized solid catalyst system including a reactor and a regenerator.

More particularly the invention relates to a method of hydrocracking nitrogen-containing feed stocks over a nickel catalyst at conditions of low temperature which results in improved product distribution. The present invention teaches process conditions which make a nickel catalyst practical and usable for hydrocarbon feed stocks previously considered not suitable for conversion or cracking over this catalyst.

It is known that nitrogen-containing hydrocarbon feed stocks rapidly deactivate hydrocracking catalysts and that regeneration of such deactivated catalysts in fixed bed operations as practiced in the past is not entirely satisfactory. It has now been found that a nickel catalyst on a silica-alumina cracking catalyst can be substantially completely regenerated a large number of times without significant loss in catalyst activity.

The rapid deactivation of the nickel on silica-alumina cracking catalyst in hydrocracking oil feeds containing relatively high nitrogen concentrations such as raw unhydrofined oil feeds including catalytic cycle oil is of much less consequence in short cycle operations than in conventional fixed bed operation since only the high activity portion of the catalyst activity decline curve is used before the catalyst is regenerated.

According to the present invention high nitrogen-containing hydrocarbon feed stock (containing not less than about 30 parts per million or p.p.m.) can be hydrocracked at a low temperature with good product distribution by regenerating the catalyst after a short cracking period in a continuous fluid catalyst process where the catalyst is continuously circulated between the reactor and the regenerator. The invention specifies the catalyst holding time in the reactor, the oil feed rate as well as the other reaction conditions of temperature, pressure and hydrogen rates that are required to operate on a nitrogen-containing or non-hydrofined feed in a fluidized solid catalyst system.

More specifically the present invention relates to a hydrocracking process using a hydrogenation-cracking catalyst and high nitrogen containing oil feeds (not less than about 30 p.p.m.) such as raw non-hydrofined catalytic cycle oil boiling above about 350° F. in a fluidized solid catalyst system and in the preferred form including a reactor and a regenerator. The feed stocks to be hydrocracked can contain up to about 3,000 p.p.m. or more of nitrogen in the process of the present invention. The raw feed may also contain about 0.4 weight percent sulfur or higher. More particularly the pressure is maintained at least about 350 p.s.i.g., the temperature is relatively low, the catalyst is nickel metal on a cracking catalyst such as silica-alumina, at least about 6,000 and preferably more than about 7,500 cu. ft. of hydrogen per barrel of feed are passed with the feed to the reactor. The catalyst is regenerated under pressure with air by burning off the carbon or coke and any deposited contaminants.

In the drawing the figure represents a diagrammatic showing of an apparatus adapted to carry out the process of the invention.

Referring now to the drawing the reference character 10 designates a reactor and the reference character 12 designates a regenerator. The finely divided catalyst in the system has an average particle size of between about 20 and 100 microns with about 90% in this range and some particles being larger and some smaller. The catalyst contains about 6 weight percent nickel (unsulfided) metal on a cracking catalyst such as silica-alumina containing about 13% alumina. Other silica-alumina cracking catalysts containing higher percentages of alumina up to about 40% may be used as supports or other cracking catalysts such as, silica-zirconia, silica-alumina-magnesia, silica-magnesia, silica-alumina-boria, etc. may be used as supports.

The oil feed may be any suitable stock boiling above about 350° F. and up to 650° F. or higher, such as naphthas, kerosenes, gas oils, coker distillates, catalytic or thermal cycle oils. The process is especially adapted for handling aromatic stocks such as catalytic cycle oils boiling between about 400° F. and 650° F. The oil feed heated in any suitable manner by heat exchange with product streams or by passage through a furnace (not shown) to a temperature between about 60° F. and 700° F. is passed through line 14 and introduced along with hot recycle hydrogen-containing gas, heated to between about 60° F. and 700° F., from line 16 into the lower portion of the fluid bed 18 of catalyst in the reactor 10. The recycle gas contains between about 50% and 95% by volume of hydrogen. The fluid bed is maintained as a dense turbulent fluidized or liquid simulating bed by upflowing gaseous fluid including the oil feed and the hydrogen gas and has a level indicated at 20. The superficial velocity of the upflowing gas in the reactor is between about 0.15 and 1.0 ft./sec.

Fresh make-up hydrogen from an extraneous source is introduced into line 14 from line 22. Hot regenerated catalyst from regenerator 12 is passed through line 24 into the lower portion of fluidized bed 18 in the reactor. The temperature of the fluidized bed 18 and the hydrocarbons being cracked in the reactor 10 is between about 550° F. and 750° F. The pressure in reaction zone 10 is between about 350 and 1000 p.s.i.g. The catalyst holdup in reactor 10 is between about ¼ and 6 hours. The oil feed rate is between about 0.3 and 2 w./hr./w. (weight of oil per hour per weight of catalyst). This is equivalent to a catalyst to oil ratio between about 0.5 and 4.0 where the catalyst and oil are by weight.

Vaporous reaction products and hydrogen pass upwardly and after they leave the fluid bed 18 they are passed through solids separating means (not shown) such as cyclone separator means to separate entrained solid catalyst particles from the gasiform products and to return the separated solids to the fluid bed 18. The cyclone separator may be located inside the reactor 10 at the top thereof. As the hydrocracking reaction is exothermic, heat removal means such as a coil 25 is provided and submerged in the fluid bed 18. The coil 25 has an inlet end 26 for a heat exchange medium such as water and an outlet end 28 for the heated heat exchange medium or steam. Other methods or means for removing heat from the reaction zone 10 may be used, such as, introduction of cold recycle gas or cold feed (i.e. not preheated) into the reactor.

The vaporous and gaseous products leave the top of reactor 10 through line 30 and pass through condenser 32 to condense normally liquid products and the cooled and condensed products are passed into gas-liquid separator 34 to separate gas from liquid hydrocarbons. The liquid hydrocarbons are withdrawn from the bottom or lower portion of separator 34 through line 36 and are fractionated in a known manner to separate high octane gasoline from higher boiling hydrocarbons (not shown). The hydrocarbons boiling above about 375° to 430° F. are recycled with the feed through line 14 and cracked to extinction or they may be removed from the process as a product.

The separated gas in line 38 contains about 50 to 95% hydrogen and a small amount of nitrogen compounds such as ammonia and it is preferred to remove the nitrogen compounds by passing the gas leaving separator 34 by line 38 to a purification zone 40. This purification is accomplished by treating the gas with an adsorbent or by washing with an acid to remove ammonia and low molecular weight amines. With most feeds, the gas will contain practically no sulfur compounds, such as $H_2S$, because the sulfur in the oil feed combines with the nickel of the catalyst and will be expelled with the flue gas during catalyst regeneration. With feeds of very high sulfur content, i.e. greater than about 2%, the recycle gas may contain some sulfur compounds such as $H_2S$. In these cases it is preferred to remove the sulfur compounds from the gas. This can be also accomplished in a second zone similar to purification zone 40 by treating the gas with a caustic or di-ethanol amine solution in addition to the above described methods for ammonia removal.

Or the gas may bypass zone 40 through line 41 if there is no sulfur or nitrogen removal problem that cannot be adequately handled by a purge of recycle gas. Gas may be purged or removed from the process through valved line 39. The purified gas containing between about 50% and 98% hydrogen is recycled to the reactor 10 through line 16. At least about 6000, and preferably at least 7,500 cubic feet of hydrogen (standard conditions) per barrel of feed are introduced into reactor 10 through line 14. The amount of hydrogen is preferably about 10,000 and may be as high as 25,000 cu. ft. per barrel of freed. Sulfur and/or nitrogen containing gas is removed from zone 40 through line 40'. The recycle gas in line 16 is compressed to a pressure between about 370 and 1050 p.s.i.g. in compressor 41' and heated to a temperature between about 60° F. and 700° F. in heater 41'' before returning to reactor 10.

During the hydrocracking reaction the catalyst in reactor 10 becomes contaminated with coke and this lowers the activity of the catalyst. According to the present invention, the catalyst is continuously withdrawn from the reactor 10 through standpipe or the like 42 and passed through line 44 into the bottom or lower portion of regenerator 12. Preferably the spent or deactivated catalyst being removed from the reactor 10 is stripped with hydrogen gas introduced through line 45 into a stripping zone (not shown) arranged in the upper part of the standpipe 42 for stripping out adsorbed hydrocarbons. About 10 to 30 cu. ft. of hydrogen per pound of withdrawn spent catalyst may be used.

Air or other oxygen-containing gas is introduced into the lower portion of the regenerator 12 through line 46 in sufficient amount to maintain the catalyst particles as a dense fluidized turbulent liquid-like bed 48 having a level indicated at 50. The temperature during regeneration in regenerator 12 is between about 750° F. and 1100° F. and the pressure during regeneration is between about 350 p.s.i.g. and 1000 p.s.i.g. The superficial velocity of the gas passing up through the regenerator 12 to fluidize the solid catalyst particles is between about 0.15 and 1.5 ft./sec.

The combustion gases or flue gas leaving the dense fluidized bed 48 in the regenerator is passed through solids separating means (not shown) such as one or more cyclone separators in series to separate entrained catalyst solids from the flue gas. The cyclone separators are preferably located in the upper portion and inside the regenerator 12. The separated catalyst solids are returned to the fluid bed 48. Flue gas leaves regenerator 12 overhead through line 52 provided with a pressure control valve 53 and may be passed through a heat exchanger or waste heat boiler to recover heat therefrom. As the flue gas is under pressure it may be passed through a turbine (not shown) to recover energy and supply air under pressure as the regenerator gas introduced through line 46.

Regenerated catalyst particles are withdrawn from the regenerator 12 through standpipe or the like 54 and then passed through line 24 to the reactor 10 as previously described. The regenerated catalyst particles are preferably stripped of oxygen-containing gas adsorbed on the catalyst particles by introducing a gas such as nitrogen, steam or recycle gas into the stripping zone (not shown) at the upper end of standpipe 54 through line 56.

During regeneration of the spent catalyst some of the nickel of the catalyst is oxidized but the oxide is reduced to metallic nickel on the silica-alumina support in the reactor when the catalyst is returned to the reactor.

Thus, the oxidation of the nickel during regeneration does not destroy the activity of the catalyst. However, the oxidation does consume oxygen and the subsequent reduction of the catalyst consumes hydrogen and for economic reasons it is desirable to minimize the conversion of nickel metal to the oxide during regeneration. Staging of the regenerator for co-current flow of catalyst and air may be employed, but the most direct way of limiting the degree of oxidation of the nickel is to limit the air rate to the regenerator to that required for the combustion of the coke and contaminants.

The spent catalyst going to the regenerator may also contain some nickel sulfide because of the sulfur content of the oil feed. Thus when using a feed containing about 0.4% sulfur and a catalyst comprising 6% nickel, about 10% of the total nickel will be converted to the sulfide form. During regeneration most of this sulfur will be expelled as oxides of sulfur in the regenerator flue gas. With low temperature regeneration, i.e. below about 950° F., some of the nickel sulfide may be converted to nickel sulfate which is subsequently reduced to nickel sulfide in the reactor. This does not harm the catalyst activity but it is preferred to minimize the sulfur content of the catalyst in order to minimize the air requirements in regeneration and the hydrogen consumption in reducing the regenerated catalyst. (Oxidation of nickel sulfide to nickel sulfate requires more oxygen than that required for oxidizing nickel metal to nickel oxide. Also reducing nickel sulfate to the sulfide consumes more hydrogen than that required for reducing the oxide to nickel metal.) Consequently, as practically all feeds of petroleum origin contain some sulfur compounds, it is preferred to operate the regenerator at a temperature above about 950° F. to aid in removing sulfur from the catalyst.

The catalyst preferred for this fluid hydrocracking process is nickel in metallic form on a conventional silica-alumina cracking catalyst containing about 13% of alumina and the rest silica. In the fresh or regenerated catalyst the nickel is unsulfided and is present as substantially all in the metallic form after reduction. The catalyst contains about 2 to 6 weight percent of metallic nickel on the cracking catalyst support.

The catalyst is prepared by starting with commercial or conventional silica-alumina cracking catalyst and to about 100 pounds (dry weight) of catalyst are added about 19 gallons of a solution prepared by dissolving 31½ pounds of nickelous nitrate hexahydrate in water. After mixing to ensure uniform wetting of all of the cracking catalyst particles the composite is dried at 250° F. After drying the material is heated to 600° F. for up to 16 hours to decompose the nickel nitrate to nickel oxide and gaseous oxides of nitrogen which escape. The catalyst is finally activated by calcining at 1000° F. for up to 16 hours. In this state, the catalyst consists of nickel oxide on the silica-alumina base. For use in hydrocracking the nickel oxide is reduced to nickel metal by treating with hydrogen at temperatures of about 500° to 750° F. The preferred way of doing this is in the hydrocracking unit. For instance, the nickel oxide form can be charged directly to the regenerator as the catalyst will be reduced when it is transferred to the hydrocracking reactor.

The catalyst prepared by the above procedure contains about 6% nickel expressed as metal. When employing a commercial cracking catalyst of 13% $Al_2O_3$–87% $SiO_2$ having a surface area of 652 m.²/gram, the finished catalyst has a surface area of about 420 square meters per gram. Using a higher alumina content cracking catalyst results in less loss of surface area in the preparation.

During hydrocracking according to the present fluid solids system about 1300 s.c.f. of hydrogen are consumed at 50% conversion of oil feed to products that are lower boiling than 430° F. During hydrocracking of heating oil fractions boiling below about 650° F., the amount of coke make is between about 0.1 and 1.0 weight percent on oil feed. With higher boiling feeds such as heavy gas oils, the coke make may be higher depending upon the final boiling point of the feed.

Data are given in Table I showing the effect of nitrogen in feed in a fluid cracking reactor. The heating oil or catalytic cycle oil feed in the following tables had an initial boiling point of about 450° F. and a final boiling point of about 600° F.

Table I 500 p.s.i.g., 1.3 w./hr./w., 660° F.
6 Weight Percent Metallic Nickel on Silica-Alumina Cracking Catalyst containing 13% alumina

| Heating Oil Feed Source | Virgin | Catalytic Cracker | Coker |
|---|---|---|---|
| P.p.m. of N (nitrogen) in Feed | 30 | 50 | 550 |
| | Vol. Percent Conversion to 430° F. minus | | |
| Cracking Period, Minutes: | | | |
| 112 | | 25 | |
| 88 | 68 | 45 | |
| 56 | 70 | 52 | 26 |
| 24 | 75 | 60 | 52 |

The data in Table I show that high nitrogen feeds greatly reduce the activity and activity maintenance of the hydrocracking catalyst but that even such high nitrogen feeds can be hydrocracked to satisfactory conversion levels by going to a short hydrocracking period between regenerations.

Data are given in Table II on hydrocracking a raw catalytic cycle oil (50 p.p.m. N) at 400 p.s.i.g. on the same type catalyst given above in Table I and show that conversion increases with increasing temperature and that selectivity to gasoline decreases with increasing temperature.

Table II

| Temp., °F | 500 | 600 | 700 | 800 |
|---|---|---|---|---|
| Vol. percent Conversion to 430° F. and lighter | 7 | 38 | 48 | 51 |
| Selectivity at 60 Vol. Percent Conversion, Yields: | | | | |
| $C_3$, wt. percent | | 1.3 | 3.7 | 6.0 |
| $C_4$, vol. percent | | 7.4 | 14.0 | 14.5 |
| $C_5$, −430 vol. percent | | 66.0 | 59.0 | 47.0 |

From Table II it will be learned that for maximum gasoline selectivity, temperature should be kept as low as is consistent with good conversion at a given operating pressure.

Data in Table III show the effect of pressure in hydrocracking oils using the same nickel type catalyst described above in Table I, and with a hydrocracking temperature of 600° F.

Table III

| Feed | Hydrofined Catalytic Cycle Oil (2 p.p.m. $N_2$) | | | | | Raw Catalytic Cycle Oil (50 p.p.m. $N_2$) | | |
|---|---|---|---|---|---|---|---|---|
| Pressure, p.s.i.g. | 1,000 | 500 | 400 | 300 | 200 | 1,000 | 500 | 400 |
| Vol. percent Conversion to 430° F. and lighter | 98 | 64 | 45 | 27 | 20 | 87 | 52 | 38 |

The data in Table III indicate that conversion increases with increasing pressure and that pressures between 350 and 1000 p.s.i.g. are to be selected. The data in Table III show also that very low conversions are obtained at pressure such as 200 p.s.i.g. or lower even with severely hydrofined feed (2 p.p.m. $N_2$) and even lower conversions would be expected with feeds containing relatively high amounts of nitrogen.

Data in Table IV illustrate the effect of changing the nickel content of the catalyst on the conversion of a raw catalytic cycle oil (50 p.p.m. N) feed at 600° F., 500 p.s.i.g. and 10,000 c.f. of hydrogen per bbl. of feed.

Table IV

| Nickel content of catalyst, wt. percent on silica-alumina | 0.5 | 2 | 6 |
|---|---|---|---|
| Vol. percent conversion to 430° F. minus | 22 | 26 | 48 |
| Carbon make, wt. percent on feed | 1.2 | 0.6 | 0.8 |

These data show that lowering the nickel content results in a catalyst of lower activity and causes an increase in carbon make at a given conversion. This increased carbon make associated with the low nickel content catalyst is undesirable in that it increases the amount of air that has to be compressed for use in regeneration. As the nickel also undergoes oxidation during the regeneration, too high a nickel content catalyst is also undesirable from the standpoint of air requirement in the regenerator. Consequently a catalyst containing between about 2% and 6% nickel is preferred.

The data in Table V show the effect of hydrogen gas rate on conversion.

Table V 500 p.s.i.g., 1.3 w./hr./w., 610° F. Raw Catalytic Cycle Oil Feed (50 p.p.m. N), 6% Ni on Silica-alumina Cracking Catalyst (13% $Al_2O_3$), 24 minute Cracking Period.

| $H_2$ rate SCF/B | 11,000 | 23,000 |
|---|---|---|
| Vol. percent conversion to 430° F. minus | 62.7 | 45.7 |
| Yields: | | |
| $C_3$, minus wt. percent | 2.7 | 1.4 |
| $C_4$, Vol. percent | 8.3 | 11.2 |
| C, −430° F. Vol. percent | 65.2 | 45.9 |
| Coke wt. percent on feed | 1.0 | 0.3 |

These data in Table V show that high hydrogen gas rates lower conversion to lower boiling hydrocarbons but also lower coke make.

While the invention in its broader form may be practiced with unsulfided nickel metal on silica-alumina cracking catalyst for hydrocracking oil feeds containing at least 30 p.p.m. of nitrogen where the conditions are given as ranges such as 350–1000 p.s.i.g., the temperature between about 550° F. and 750° F., a catalyst holding time between about 15 minutes and 4 hours, a w./hr./w. between about 0.3 and 2, a catalyst to oil feed ratio by weight between about 0.5 and 4, between about 7,500 s.c.f. H$_2$/barrel of feed and 25,000 s.c.f. H$_2$/barrel of feed, and regeneration of the catalyst with air between about 750° F. and 1100° F. at about the same pressure as the reactor pressure, in the specific form of the invention using the 6% by weight metal unsulfided nickel catalyst on silica-alumina cracking catalyst, the preferred conditions are as follows, pressure is about 5000 p.s.i.g., the temperature is about 700° F., the w./hr./w. is about 1.3, the catalyst to oil ratio by weight is about 1.5, about 9000 s.c.f. H$_2$/barrel of feed, a ½ hour catalyst holding time in the reactor, regeneration of the catalyst at about 960° F. at about 500 p.s.i.g. pressure. A pressure between about 400 and 600 p.s.i.g., a temperature between about 600° F. and 700° F., a w./hr./w. between about 0.5 and 2 may be used.

In a specific example about 2400 barrels per calendar day (b./c.d.) of a raw unhydrofined catalytic cycle oil having an initial boiling point of about 430° F. and a final boiling point of about 610° F. and containing about 50 p.p.m. of nitrogen and about 0.4 wt. percent sulfur are heated to a temperature of about 500° F. under pressure and passed into reactor 10 along with hydrogen-containing gas. The temperature in reactor 10 is maintained at about 660° F. The pressure in the reactor 10 is about 500 p.s.i.g. Hot regenerated catalyst at a temperature of about 960° F. is introduced into the reactor 10 through line 24 at a catalyst to oil feed ratio by weight of about 1 and at a w./hr./w. in the reactor of about 1.3.

The hydrocracking catalyst is an unsulfided metallic nickel catalyst, 6 wt. percent Ni on silica-alumina cracking catalyst as above described. The catalyst has a particle size between about 20 and 100 microns. The gases and vapors passing up through the catalyst particles maintain the catalyst particles as a dense fluidized bed having a density of about 40 lbs./cu. ft. As the hydrocracking reaction is exothermic, heat is removed from the reactor 10 by steam coil 24 to maintain the desired temperature in the reactor. About 5,000 lbs. of water per hour at about 80° F. are passed into line 26 and withdrawn from coil 25 through line 28 as steam at a temperature of about 600° F. and a pressure of about 1500 p.s.i.g.

About 12,000 s.c.f. H$_2$/barrel of feed at a temperature of about 500° F. are introduced into reactor 10 through line 14 and this includes recycle gas and make-up hydrogen from line 22.

Reaction products in vapor form and gas pass overhead through line 30 and are cooled to a temperatuer of about 35° F. and liquid hydrocarbons are separated from gases in gas-liquid separator 34. The liquid product is withdrawn from line 36 and the gases pass overhead through lines 38, 41 and 16. The gases contain about 90 vol. percent hydrogen and these gases are passed through compresser 41' and heater 41'' to heat the gases to about 580° F. and to raise the pressure to about 540 p.s.i.g. and returned to reactor 10 along with make-up hydrogen from line 22.

The total liquid product separated or recovered in an amount of about 2,650 barrels/c.d. and withdrawn through line 36 is subjected to distillation to separate the gasoline product.

The product distribution of the above conversion is as follows.

Yield:
```
C₃, minus wt. percent _____  2.0
C₄, vol. percent _____  6.7
C₅, −180° F., vol. percent _____ 12.8
180–375° F., vol. percent _____ 25.2
375–430° F., vol. percent _____ 11.1
180–430° F., vol. percent _____ 36.3
C₅, −430° F., vol. percent _____ 49.1
430° F.+vol. percent _____ 53.6
Vol. percent conversion to 430° F. minus _ 46.4
```

Hydrogen Consumption:
s.c.f./b. of Feed _____ 1300

| Inspections on Gasoline Fraction | 65–180° F. | 180–375° F. | 375–430° F. |
|---|---|---|---|
| Paraffin Content, Vol. Percent | 97.4 | 34.1 | 28.0 |
| Naphthene Content, Vol. Percent | | 32.7 | 22.7 |
| Aromatic Content, Vol. Percent | 2.6 | 33.2 | 49.3 |
| Octane No.: Research plus 3 cc. TEL | 98.1 | 90.7 | 96.7 |
| Motor plus 3 cc. TEL | 98 | 86 | 84 |

Inspections on 430° F. plus (rerun to minimum bottom):
```
Gravity, ° API _____ 34.1
Sulfur, wt. percent _____ 0.01
Aniline Point, ° F. _____ 124
Color, TAG–Robinson _____ 25
```

About 1300 barrels per calendar day of regular gasoline blended to 10 pound vapor pressure having a Research octane number of 95.5 with 3 cc. of tetraethyl lead are produced. For the production of premium grade gasoline, the 180–375° F. fraction can be catalytically reformed. This fraction is an excellent feed for catalytic reforming because of its low paraffin content and high naphthene content.

In addition, a small amount of fuel gas and about 60 b./d. of LPG (liquefied petroleum gas) and about 1290 barrels per day of 430–650° F. heating oil are produced. The quality of this heating oil is substantially improved over that of the catalytic heating oil employed as feed in respect to color and color stability. It can utilized as a high quality heating oil or can be recycled to the fluid hydrocracker to give additional yields of gasoline.

The catalyst in reactor 10 has an average hold-up time of about 45 minutes and becomes partly inactivated by hydrocarbonaceous deposits and other deposits. The partially spent catalyst is continuously withdrawn from reactor 10 through lines 42 and 44 and passed to regenerator 12 maintained under a pressure of about 500 p.s.i.g. and a temperature of about 960° F. The catalyst particles are maintained as a dense fluidized turbulent mixture by the air and combustion gas passing up through the regenerator 12 at a superficial velocity of about 0.3 ft. sec. About 3 to 6 s.c.f. of air per pound of catalyst is introduced through line 46. The average holding time of the catalyst in the regenerator 12 is about 5 to 25 minutes and substantially all the hydrocarbonaceous material is burned off and the activity of the catalyst substantially restored to its original activity. The regenerated catalyst is returned continuously to the reactor 10 through lines 54 and 24 at a rate of about 30,410 pounds per hour. In this example the catalyst to oil ratio by weight is 1.0 while the oil feed rate expressed as wt. of oil per wt. of catalyst in the reactor is 1.3.

There is some loss of catalyst by entrainment with gases and vapors leaving through outlet pipes or lines 30 and 52 and fresh catalyst must be added at intervals as make-up catalyst to maintain the volume of catalyst and in this way fresh catalyst replaces old partially deactivated catalyst and activity is maintained.

The following data show that the temperature, pressure, hydrogen rate and catalyst holding time in the reactor 10 may be varied within narrow limits while still obtaining the improved results of the present hydrocracking process utilizing a fluid catalyst circulated between the reactor and regenerator and using a raw or unrefined feed stock such as cracking stocks higher boiling than gasoline and containing 30 and more parts per million of nitrogen. The hydrocracked gasoline is essentially free of nitrogen.

In all the following data the catalyst was the same as above described, that is, unsulfided nickel in metal form in an amount of about 6 weight percent on silica-alumina cracking catalyst containing 13% alumina and the rest silica.

In fluid hydrocracking, the catalyst is continually exposed to repeated regeneration, cracking and again regenerated. This means that the catalyst is repeatedly exposed to the high temperature, i.e. nominally 1000° F., in the regenerator and also that the nickel on the catalyst is repeatedly oxidized in the regenerator and reduced in the reactor. This repetitive cycling of the catalyst between the regenerator and reactor causes a decrease in surface area and in the activity of the catalyst. This loss is initially very rapid, but the rate of loss becomes progressively less. After several hundred cycles of regeneration, the rate of loss becomes minor and the catalyst is said to have "lined-out" or to have equilibrated and such catalyst is referred to as equilibrium catalyst. These changes are illustrated by the following characteristics of fresh and equilibrium catalyst comprising 6% nickel on a support consisting of 13% $Al_2O_3$–87% $SiO_2$ catalyst.

|  | Fresh Catalyst | Equilibrium Catalyst |
|---|---|---|
| Nitrogen Adsorption Measurements: | | |
| Surface Area, m.²/g | 420 | 295 |
| Pore Volume, cc., g | 0.59 | 0.43 |
| Catalyst Activity: Vol. percent conversion to 430° F. minus raw catalytic heating oil feed | 100 | 50 |

During catalyst regeneration, at least a part of the nickel undergoes oxidation to form nickel oxide which rapidly undergoes reduction to metallic nickel when the catalyst is returned to the reaction zone. The following tabulation illustrates the effect of this treatment on the composition of the catalyst. "Spent" is used to describe the catalyst after use in hydrocracking a raw catalytic heating oil feed containing 0.4 wt. percent sulfur and 50 p.p.m. nitrogen and represents a catalyst as it exists in the reactor just prior to being regenerated. "Regenerated" describes the catalyst after being regenerated and just prior to being returned to the reaction vessel. "Reduced" describes a freshly regenerated catalyst that has just been returned to the reactor where it rapidly undergoes reduction due to the hydrogen and hydrocarbon in the reactor.

| Analysis | Equilibrium Catalyst | | |
|---|---|---|---|
| | Spent | Regenerated | Reduced |
| Nickel, wt. percent on catalyst | 6 | 6 | 6. |
| Sulfur, wt. percent on catalyst | 0.4 to 0.8 | 0.01 to 0.3 | Not determined. |
| Carbon, wt. percent on catalyst | 0.6 | 0.0 | Do. |
| State of Nickel (by X-ray analysis) | Metal | Oxide | Metal. |

The X-ray analysis is not completely quantitative but does indicate the state in which the major portion of the nickel exists. The sulfur analyses indicate that nickel sulfide could only be present in minor amounts. The sulfur on the spent catalyst represents the sulfur introduced as sulfur compounds that are naturally present in the heating oil feed. This feed contained about 0.4 wt. percent sulfur. With higher sulfur containing feeds, such as some heavy distillates from high sulfur crudes, the sulfur content of the spent catalyst may be somewhat greater, but this does not adversely affect the catalyst.

Effect of catalyst to oil ratio

As was illustrated by the data in the previous Table I, the catalyst rapidly loses activity with time on oil between regeneration. In a fluidized catalyst unit with circulation of the catalyst between the reactor and regenerator, the average time that the catalyst is exposed to oil between regeneration is controlled by the rate at which the catalyst is circulated. The amount of oil to which the catalyst has been exposed is controlled by the ratio of catalyst circulation rate to the oil feed rate. The amount of oil that contacts the catalyst between regenerations is set by (1) the rate in pounds per hour at which the catalyst is circulated between the regenerator and the reactor, and (2) the oil feed rate (in pounds per hour). The weight ratio of these two streams, i.e. circulation catalyst and oil feed, is referred to as the catalyst to oil ratio. Consequently, in the present process, this ratio controls the amount of hydrocracking conversion that is obtained.

This is illustrated by the following data for the fluid hydrocracking of a feed consisting of raw catalytically cracked heating oil containing 50 p.p.m. nitrogen and 0.4% sulfur at reaction conditions of 510 p.s.i.g., 600° F. and 660° F., a feed rate of 1.3 wt. of oil per wt. of catalyst in reactor per hour using a 6% nickel on 13% $Al_2O_3$–87% $SiO_2$ catalyst. The hydrogen rate is about 11,000 s.c.f. per barrel of feed.

| Average age of catalyst since regeneration, min | 15 | 30 | 45 | 60 | 75 |
|---|---|---|---|---|---|
| Average age of catalyst as wt. of oil processed/wt. of catalyst in reactor, since regeneration | 0.32 | 0.65 | 0.98 | 1.3 | 1.6 |
| Wt. ratio of circulating catalyst to oil feed | 3 | 1.5 | 1.0 | 0.77 | 0.6 |
| Conversion, vol. percent to 430° F. minus for: | | | | | |
| 660° F. reaction temperature | 65 | 55 | 45 | 35 | 25 |
| 600° F. reaction temperature | 55 | 45 | 35 | 26 | 16 |

This conversion can be controlled by catalyst to oil ratio as well as by temperature and feed rate. As the reaction temperature is increased the selectively is worsened in that a higher yield of light gas and a lower yield of gasoline is obtained. Consequently the catalyst to oil ratio must be controlled in order to obtain satisfactory conversion. As shown in the above tabulation, a catalyst to oil ratio greater than 0.5 is required to obtain a practical level of conversion. With feeds containing greater amounts of nitrogen, or with catalysts containing less than 6% nickel, higher catalyst to oil ratios up to about 6 are required.

Effect of recycle hydrogen rate

As pointed out earlier (see Table IV), the hydrogen rate affects both conversion and coke make. It is preferred to use a relatively high hydrogen rate to minimize coke make and to adjust conversion by temperature, catalyst to oil ratio and/or feed rate. The following tabulation illustrates the effect of hydrogen rate on carbon make at 50% conversion of raw catalytic heating oil (50 p.p.m.

nitrogen) in fluid hydrocracking at 510 p.s.i.g. and 600° F. and 650° F. reactor temperature and a 6% nickel catalyst.

| Hydrogen rate, s.c.f. per bbl. of feed | 7,500 | 8,500 | 10,000 | 12,000 | 23,000 |
|---|---|---|---|---|---|
| Coke make, wt. percent on feed: | | | | | |
| 600° F. reactor temp | 2.7 | 2.5 | 0.9 | 0.7 | |
| 660° F. reactor temp | | | 0.8 | 0.5 | 0.3 |

Since fluid hydrocracking requires frequent regeneration of the catalyst, the amount of carbon to be burned becomes of prime importance. Although the process is operable at conditions of 7,500 s.c.f. of hydrogen per barrel of feed, a rate of 10,000 s.c.f.b. or higher is preferred.

*Typical data for various feeds*

Typical data for fluid hydrocracking of a number of feed stocks using a 6% nickel catalyst are given below. All of these feeds are derived from mixed Louisiana crude. Some are virgin distillates and some are distillates from catalytic cracking of gas oil or coking of residuum.

| Feed | A | B | C | D | E | F |
|---|---|---|---|---|---|---|
| | Catalytic cracked heating oil | Virgin heating oil | Coker heating oil | Virgin gas oil | Virgin gas oil | Coker gas oil |
| Feed Inspections: | | | | | | |
| Gravity, °API | 30.5 | 35.7 | 25.7 | 27.9 | 33.0 | 17.7 |
| Nitrogen, p.p.m | 50 | 30 | 548 | 330 | 112 | 2,072 |
| Sulfur, wt. percent | 0.38 | 0.08 | 0.7 | 0.11 | 0.09 | 1.0 |
| Engler Distillation: | | | | | | |
| IBP., ° F | 402 | 480 | 500 | 556 | 382 | 445 |
| 5% at ° F | 468 | 538 | 521 | 640 | 448 | 538 |
| 50% at ° F | 524 | 551 | 552 | 797 | 554 | 737 |
| 95% at ° F | 594 | 582 | 645 | | 744 | 955 |
| F.B.P., ° F | 612 | 588 | 680 | 928 | 744 | 955 |
| Percent residue | 2 | 2 | 1.5 | 10 | 5 | 4 |
| Hydrocracking Conditions: | | | | | | |
| Temperature, ° F | 660 | 660 | 660 | 660 | 660 | 660 |
| Pressure, p.s.i.g | 510 | 510 | 510 | 510 | 510 | 510 |
| Oil feed rate, w./hr./w [1] | 1.3 | 1.3 | 1.3 | 1.3 | 0.97 | 1.2 |
| Average age of cat since regen | [3] 28 | [3] 28 | [3] 28 | [3] 28 | [3] 28 | [3] 28 |
| C/O ratio [2] | 1.6 | 1.6 | 1.6 | 1.6 | 2.1 | 1.7 |
| Hydrogen rate, s.c.f./bbl. feed | 12,000 | 13,000 | 15,000 | 13,000 | 18,000 | 17,000 |
| Conversion, vol. percent to 430° F. minus | 52 | 71 | 26 | 55 | 60 | 41 |
| Coke make, wt. percent on feed | 0.6 | 0.3 | 0.9 | 7.6 | 4.6 | 15.2 |

[1] w./hr./w.=Weight of oil per wt. of catalyst in reactor per hour.
[2] C/O ratio=Ratio of wt. of catalyst circulated to and from regenerator per hr. to weight of oil fed to reactor per hour.
[3] Minutes.

These data show the effect of feed type, feed impurities and feed boiling point on conversion to products boiling below 430° F. and on coke make. Coke makes are relatively low on those feeds boiling below about 750° F. As the amount of material boiling above 750° F. in the feed increases the coke make increases and the inclusion of material boiling above 950° F. causes a drastic increase in coke make.

| Feed | A | B | C | D |
|---|---|---|---|---|
| | Catalytic cracked heating oil | Virgin heating oil | Coker heating oil | Virgin gas oil |
| 430° F. conversion, vol. percent | 52 | 71 | 26 | 55 |
| C3, wt. percent on feed | 2.0 | 2.7 | 2.1 | 3.1 |
| C4, vol. percent | 7.8 | 14.4 | 5.6 | 10.1 |
| C5-180° F. naphtha, vol. percent | 14.1 | 21.9 | 9.6 | 16.1 |
| 180-375° F. naphtha, vol. percent | 29.5 | 37.3 | 20.2 | 23.8 |
| 375-430° F. naphtha, vol. percent | 11.2 | 7.8 | 4.9 | 6.9 |
| C5/430° F. naphtha, vol. percent | 54.8 | 67.0 | 34.7 | 46.8 |
| 430° F. plus, vol. percent on feed | 48 | 29 | 74 | 45 |
| Coke, wt. percent on feed | 0.5 | 0.3 | 0.9 | 7.6 |
| Hydrogen consumption s.c.f./bbl. of feed | 1,350 | 1,040 | 610 | 660 |

As shown above, the more aromatic feeds such as the catalytic and coker heating oils give a higher volumetric yield of $C_5$–430° F. gasoline for a given amount of conversion than do the virgin stocks. On the other hand, the virgin stocks show a higher yield of butanes which are also desirable blending components for gasoline.

The quality of the various naphtha fractions for the above conversions are given below.

These data show that gasoline of good octane rating is obtained from feeds such as the catalytic cracked and coker heating oils. This is a reflection of the aromatic content of the gasoline product obtained from feeds of relatively high aromatics content. The less aromatic virgin feeds give less aromatic gasoline products which have lower octane ratings. However, as shown by the composition of the gasoline fractions, the 180-375° F. and 375-430° F. fractions have high naphthene contents and, thus, are excellent feeds for hydroforming to higher octane ratings.

As the result of experimental work done, there is an indication that lowering the nickel content of the catalyst much below 6 wt. percent produces a catalyst which is not as stable on repeated regeneration as the preferred 6 wt. percent nickel catalyst of the present invention.

| Feed | A | B | C | D |
|---|---|---|---|---|
| | Catalytic cracked heating oil | Virgin heating oil | Coker heating oil | Virgin gas oil |
| Vol. percent conversion to 430° F. and lighter | 52 | 71 | 26 | 55 |
| INSPECTIONS ON NAPHTHA FRACTIONS: | | | | |
| 65-180° F.: | | | | |
| Gravity, °API | 78.3 | 80.1 | 72.0 | 75.0 |
| Research octane number (3 cc. TEL) | 97.0 | 96.0 | 97.1 | 95.2 |
| Aromatic content, vol. percent | 3.5 | 2.0 | 4.0 | 2.1 |
| 180-375° F.: | | | | |
| Gravity, °API | 47.2 | 53.1 | 48.1 | 52.4 |
| Research octane number (3 cc. TEL) | 91.7 | 83.0 | 90.1 | 86.0 |
| Aromatic content, vol. percent | 35.0 | 14.5 | 26.4 | 15.0 |
| Naphthene content, vol. percent | 31.2 | 45.1 | 43.1 | 48.7 |
| Paraffin content, vol. percent | 33.8 | 40.4 | 30.5 | 36.3 |
| 375-430° F.: | | | | |
| Gravity, °API | 33.8 | 38.7 | 33.6 | 38.7 |
| Research octane number (3 cc. TEL) | 97.1 | 83.3 | 97.0 | 87.0 |
| Aromatic content, vol. percent | 57.2 | 30.5 | 48.7 | 30.2 |
| Naphthene content, vol. percent | 18.3 | 32.7 | 30.5 | 37.8 |
| Paraffin content, vol. percent | 24.5 | 37.8 | 20.8 | 32.0 |

With the present invention sulfiding of the nickel catalyst before use is not required and is avoided. Such sulfiding of the catalyst lowers the initial activity of the catalyst and is undesirable from the standpoint of air requirements in regeneration. Oxidizing nickel sulfide to either the oxide or the sulfate requires three times as much air as oxidizing the nickel metal to the oxide. The data indicate that extremely low nickel and low catalyst to oil ratios give very low conversions. With the present invention the air requirements for regeneration are reduced by selecting the nickel content and catalyst to oil ratios that give practical conversion levels.

The sulfur that is in the oil feed does result in converting some of the nickel metal to nickel sulfide which is converted back to the oxide during regeneration. For example, with a raw catalytic heating oil which contains about 50 p.p.m. of nitrogen and 0.4 wt. percent sulfur, only about 10% of the nickel on the catalyst will be converted to nickel sulfide. This results from the necessity of regenerating the catalyst after contacting with the amount of nitrogen-containing feed that introduced this much sulfur. The amount of oil (and sulfur) to which the catalyst is exposed before requiring regeneration is determined primarily by the nitrogen content of the oil feed. Thus, the amount of sulfur which contacts the catalyst is a function of both the nitrogen and sulfur content of the oil feed. With higher sulfur feeds, the nickel may become sulfided to a greater extent but with oil feeds having up to about 2.0 wt. percent sulfur, the nickel sulfide of the catalyst is converted substantially completely to nickel oxide on regeneration. Any sulfiding of the nickel catalyst which occurs in actual commercial operation will not be harmful, but at any rate, sulfiding of the nickel catalyst is not required and preferably the nickel catalyst rather than the sulfided form is used.

With oil feeds having higher sulfur contents than about 2.0 wt. percent, the complete removal of the sulfur from the catalyst becomes less important as the catalyst would become substantially completely sulfided between regenerations and thus more air will be needed in the regeneration of such catalysts. The higher regeneration temperature of about 950–1000° F. is preferred for substantially complete removal of sulfur from the catalyst by burning and expelling the sulfur as oxides in the regenerator flue gas when hydrocracking oil feeds containing below about 2.0 wt. percent sulfur.

The present invention is useful with relatively high boiling feed stocks which are substantially completely vaporized in the reactor 10 and this is one reason that residual petroleum stocks such as topped crude petroleum oils, tars, pitches, atmospheric residua, etc. are preferably excluded from the present invention.

What is claimed is:

1. A method of hydrocracking unhydrofined hydrocarbon stocks boiling above about 350° F. and containing at least about 30 p.p.m. of nitrogen which comprises contacting the hydrocarbon feed stock in a reaction zone with a catalyst consisting essentially of 2 to 6% by weight of unsulfided nickel in metallic form on a cracking catalyst as a support at a temperature between about 550° F. and 700° F., at a pressure between about 350 p.s.i.g. and 1000 p.s.i.g. in the presence of at least 6000 cubic feet of hydrogen per barrel of feed with a catalyst time in said reactor between about 15 minutes and 120 minutes and recovering lower boiling hydrocarbons from the reaction products leaving said reaction zone, withdrawing partially spent catalyst containing contaminating deposits from said reaction zone and passing it to a regeneration zone for contact with air to burn off contaminating deposits from said catalyst, maintaining said catalyst particles as a dense fluidized turbulent bed in said regeneration zone at a temperature between about 750° F. and 1100° F. under a pressure of between about 350 p.s.i.g. and 1000 p.s.i.g. and then returning said regenerated catalyst particles to said reaction zone and continuously circulating said solid catalyst particles between said reaction zone and said regeneration zone.

2. A method of hydrocracking high boiling hydrocarbons containing not less than about 30 parts per million of nitrogen with finely divided unsulfided metallic nickel catalyst containing about 6 weight percent nickel on a silica-alumina cracking catalyst support in a fluidized solids system which comprises hydrocracking hydrocarbon feed with a fluidized turbulent bed of said nickel catalyst in a reaction zone maintained at a temperature between about 500° F. and 700° F., at a pressure between about 350 p.s.i.g and 1000 p.s.i.g., in the presence of between about 7,500 and 13,000 s.c.f. of H₂ per barrel of feed at an oil feed rate between about 0.3 w./hr./w. and 2.0 w./hr./w. with a catalyst holding time in said reaction zone of between about 15 minutes and 120 minutes and recovering lower boiling hydrocarbons from the reaction products leaving said reaction zone, withdrawing partially spent catalyst containing contaminating deposits from said reaction zone and passing it to a regeneration zone for contact with air to burn off contaminating deposits from said catalyst, maintaining said catalyst particles as a dense fluidized turbulent bed in said regeneration zone at a temperature between about 750° F. and 1100° F. under a pressure of between about 350 p.s.i.g. and 1000 p.s.i.g. and then returning said regenerated catalyst particles to said reaction zone and continuously circulating said solid catalyst particles between said reaction zone and said regeneration zone.

3. A method of hydrocracking raw high boiling hydrocarbon feed stocks containing deactivating amounts of nitrogen for the catalyst which comprises hydrocracking in a reaction zone said feed stock with an unsulfided metallic nickel catalyst containing about 6 weight percent nickel on a cracking catalyst support at a temperature of about 500° F. to 700° F., a pressure above about 350 p.s.i.g. in the presence of at least 6000 cubic feet of hydrogen per barrel of feed, at an oil feed rate between about 0.3 w./hr./w. and 2.0 w./hr./w. with a catalyst holding time in said reaction zone of between about 15 minutes and 120 minutes and recovering lower boiling hydrocarbons from the reaction products leaving said reaction zone, withdrawing partially spent catalyst containing contaminating deposits from said reaction zone and passing it to a regeneration zone for contact with air to burn off contaminating deposits from said catalyst, maintaining said catalyst particles as a dense fluidized turbulent bed in said regeneration zone at a temperature between about 750° F. and 1100° F. and then returning said regenerated catalyst particles to said reaction zone and continuously circulating said solid catalyst particles between said reaction zone and said regeneration zone.

References Cited by the Examiner

UNITED STATES PATENTS

| | | | |
|---|---|---|---|
| 2,428,692 | 10/1947 | Voorhies | 208—112 |
| 2,911,356 | 11/1959 | Hanson | 208—110 |
| 2,912,375 | 11/1959 | McLoren | 208—254 |
| 2,924,570 | 2/1960 | Herrmann et al. | 208—112 |
| 2,944,005 | 7/1960 | Scott | 208—109 |

DELBERT E. GANTZ, *Primary Examiner.*

ALPHONSO D. SULLIVAN, *Examiner.*